(12) United States Patent
Cobb

(10) Patent No.: US 6,883,804 B2
(45) Date of Patent: Apr. 26, 2005

(54) SEAL RING HAVING SECONDARY SEALING LIPS

(75) Inventor: Larry Cobb, Kingwood, TX (US)

(73) Assignee: Parker-Hannifin Corporation, Cleveland, OH (US)

(*) Notice: Subject to any disclaimer, the term of this patent is extended or adjusted under 35 U.S.C. 154(b) by 0 days.

(21) Appl. No.: 10/439,626

(22) Filed: May 16, 2003

(65) Prior Publication Data

US 2004/0012156 A1 Jan. 22, 2004

Related U.S. Application Data

(60) Provisional application No. 60/395,285, filed on Jul. 11, 2002.

(51) Int. Cl.$^7$ ................................................ F16J 15/02
(52) U.S. Cl. ......................... 277/549; 277/556; 277/562
(58) Field of Search ................................ 277/549, 562, 277/565–566, 644, 648–649

(56) References Cited

U.S. PATENT DOCUMENTS

| | | | | |
|---|---|---|---|---|
| RE24,332 E | * | 6/1957 | Svenson | 277/566 |
| 2,841,429 A | * | 7/1958 | McCuistion | 277/402 |
| 2,934,363 A | * | 4/1960 | Knox | 277/468 |
| 3,052,478 A | * | 9/1962 | Horvereid | 277/394 |
| 3,169,776 A | | 2/1965 | Felt | |
| 3,215,441 A | * | 11/1965 | Horvereid | 277/437 |
| 3,608,913 A | * | 9/1971 | D'Assignies | 277/556 |
| 3,642,290 A | | 2/1972 | Millsap | |
| 3,885,801 A | | 5/1975 | Scannell | |
| 4,013,299 A | | 3/1977 | Scott | |
| 4,143,883 A | * | 3/1979 | Paynter | 277/530 |
| 4,174,846 A | | 11/1979 | Scott | |
| 4,328,972 A | | 5/1982 | Albertson et al. | |
| 4,687,212 A | | 8/1987 | Timpson, Jr. et al. | |
| 5,297,805 A | * | 3/1994 | Merkin et al. | 277/322 |
| 5,431,415 A | | 7/1995 | Millonig et al. | |
| 5,472,216 A | | 12/1995 | Albertson et al. | |
| 5,480,163 A | * | 1/1996 | Miser et al. | 277/437 |
| 5,992,893 A | | 11/1999 | Watkins | |
| 6,209,882 B1 | | 4/2001 | Riess | |
| 6,290,235 B1 | | 9/2001 | Albertson | |
| 6,367,554 B1 | | 4/2002 | Theiss | |

FOREIGN PATENT DOCUMENTS

| | | |
|---|---|---|
| EP | 0 204 110 | 12/1986 |
| WO | WO 02/01038 | 1/2002 |
| WO | WO 02/36932 A1 | 5/2002 |

OTHER PUBLICATIONS

Parker Seals Polypak™ Seal Design Handbook, Catalog EPS 3800/U.S.A.© 2001.

Parker Seals Rod and Piston U–Packing Seals/Rod Wipers Catalog 5225A USA. Applicants request the Examiner to consider this reference as prior art under 102(a), however, Applicants respectfully reserve the right to supplement this Information Disclosure Statement and take a contrary position should it be necessary.

(Continued)

*Primary Examiner*—Heather Shackelford
*Assistant Examiner*—Vishal Patel
(74) *Attorney, Agent, or Firm*—John A. Molnar, Jr.

(57) ABSTRACT

Seal for the static or dynamic sealing of joints, machine parts or other components or structures such as may be found in choke, kill, or other auxiliary line strings for marine oil or gas well risers, hydraulic or pneumatic cylinders or other actuators. The seal may have a U-cup or solid geometry profile including a secondary sealing lip on both the inner and outer diameter thereof which functions as a wiper for the exclusion of outside contaminants, such as seawater, from joint sealed.

16 Claims, 2 Drawing Sheets

OTHER PUBLICATIONS

Parker Seals Total Hydraulic/Pneumatic Sealing Systems, Revised Aug. 1, 1999.

Front cover, p. 8, and back cover from Parker Seals Sealing Solutions Guide Catalog 5000A USA. Applicants request the Examiner to consider this reference as prior art under 102(a), however, Applicants respectfully reserve the right to supplement this Information Disclosure Statement and take a contrary position should it be necessary.

Parker Seals Mechanical Design Considerations dated Aug. 2001.

Parker Seals Technical Bulletin No. 5218B1–USA dated Aug. 2001.

Pages E25 thru E32 from Parker Hannifin GmbH Pradifa–Packing Division for Ultrathan® Rod Seal—Profil BD, dated Feb. 1996.

Parker–Pradifa GmbH Rod Seal Profile BS. Applicants request the Examiner to consider this reference as prior art under 102(a), however, Applicants respectfully reserve the right to supplement this Information Disclosure Statement and take a contrary position should it be necessary.

Parker Hannifin GmbH Ultrathan® Rod Seal Profil BS. Applicants request the Examiner to consider this reference as prior art under 102(a), however, Applicants respectfully reserve the right to supplement this Information Disclosure Statement and take a contrary position should it be necessary.

Parker Hannifin Packing Divisoin Quotaqtion for Nobel Drilling with drawings, dated May 2, 2001.

Parker Engineered Polymer Systems Drawing dated Apr. 19, 2001 for "Sealing Concept #1".

Parker Engineered Polymer Systems Drawing dated Apr. 19, 2001 for "Sealing concept #2".

Parker drawing for BS Profile U–Cup, dated Dec. 1, 1987.

* cited by examiner

SEAL RING HAVING SECONDARY SEALING LIPS

CROSS-REFERENCE TO RELATED APPLICATIONS

The present application claims the benefit of the filing date of U.S. Provisional Application Ser. No. 60/395,285, filed Jul. 11, 2002, the disclosure of which is incorporated herein by reference.

BACKGROUND OF THE INVENTION

The present invention relates broadly to seals and the like for the static or dynamic sealing of joints such as between the sections of an choke, kill, or other auxiliary line string which run along riser strings in offshore oil or gas drilling or production, or of other components, structures, or parts such as may be found in hydraulic or pneumatic cylinders or other actuators, and more particularly to a U-cup or solid geometry profile having a secondary sealing lip on both the inner and outer diameter thereof which functions as a wiper for the exclusion of outside contaminants, such as seawater, from the joint being sealed.

Fluid seals, also known as packing rings, for machine part joints are well-known in the art. A typical application therefor involves the provision of a fluid seal intermediate relatively movable or reciprocating surfaces such between as the outer surface of a rod or piston of a hydraulic or pneumatic cylinder, or other fluid actuator, and an internal bore or other inner surface of a stationary, surrounding housing, wherein the rod or piston reciprocates axially relative to the bore surface. Such seals, known in the vernacular as rod or piston seals as the case may be, conventionally are configured in a free state as a generally annular element which is molded or otherwise formed of an elastomeric or other resilient material such as a synthetic, natural, or co-polymer rubber, or a polymeric material such as a silicone, fluoropolymer, or, preferably, a polyurethane or fluoropolymer.

A more specialized application involves use as a static or joint seal such as between the tubular sections of a choke, kill, or other auxiliary line string of a oil or gas well drilling or recovery riser string which extends undersea between a rig or floating vessel and wellhead. Joints of such type are further described in International Publication Nos. WO 02/01038 and 02/36932, and in U.S. Pat. Nos. 6,367,554 and 5,992,893. As is known in the art, various fluids may be circulated through the lines and to the wellhead for various purposes.

Typically, the seal element is seated within an annular sealing gland or cavity which is provided within one of the surfaces, such as an internal bore of the cylinder housing or of a female end of a line section, with the opening of the gland oriented as facing the other surface such as the outer surface of the rod or the male end of a mating line section. Within the gland, the seal is interposed between the rod or male section end, which is received coaxially through the seal, and a circumferential, peripheral side wall of the gland. As the piston rod reciprocates along a longitudinal axis within the bore, or as the joint may be exposed to vibrational, torsion, flexing, or other forces, the seal functions to contact the reciprocating surface of the piston, or the circumferential section of the male end, and the side wall of the gland to provide dynamic and static sealing therebetween. In this regard, as installed under stress within the gland the seal typically presents in an energized or deformed state radial forward and rearward end faces, each disposed confronting a corresponding side of the fluid pressure system, and axial inner and outer diameter faces, each defining one or more contact surfaces with a corresponding, opposing surface of the rod or section and the gland. Of course, the described configurations may be reversed such that the gland is formed on the rod or the male section end.

Ideally, a seal element of the type herein involved should provide effective sealing under static and dynamic conditions, at both low and high pressure, and with a minimum of static and dynamic friction for a long, maintenance-free service life. However, particularly in the case of a rod seal, the seal must function not only to seal the against leakage, but also to wipe the rod of liquid or other fluid film which may adhere to the outer surface thereof as the rod is extended outward of the packing gland and cylinder housing. Similarly, as the rod is retracted, it is desirable again wipe the rod to remove any contaminants therefrom which could damage the packing or which could be carried past the packing and into the cylinder. To provide these noted sealing and wiping functions, it is customary to separate wiping and sealing members in a series arrangement with the wiper mounted a spaced-apart axial distance downstream of the seal. In general configuration, the wiper member may include an elongate wiper arm for a large surface area contact with the outer surface of the rod. The seal member, in turn, may be configured as a U-cup having a low pressure side heel portion and a high pressure side axial surface which is asymmetrically bifurcated by a radially-extending channel to define, in a stressed orientation of the seal, an inner sealing lip for dynamic contact with the outer surface of the rod, and an outer sealing lip for static contact with the peripheral surface of the gland. Representative rod, piston, and wiping elements are described in International Publication No. WO 92/15807, in European Patent No. EP 204,110, and in the following U.S. Pat. Nos.: 6,290,235; 6,209,882; 5,553,872; 5,482,296; 5,472,216; 5,431,415; 5,143,382; 5,104,131; 4,935,876; 4,893,823; 4,889,349, 4,850,602; 4,723,782; 4,687,212; 4,553,761; 4,449,718; 4,417,503; 4,337,956; 4,328,972; 4,268,045; 4,231,578; 4,174,846; 4,155,557; 3,942,806; 4,013,299; 3,921,991; 3,885,801; 3,790,179; 3,642,209; 3,342,500; 3,339,932; 3,169,776; 2,997,318; 2,979,350; 2,907,596; and 2,521,248. Commercial seals and wipers are manufactured by, for example, and are disclosed in the literature of, the following companies: Parker-Hannifin Corporation, Engineer Polymer Systems Division, Salt Lake City, Utah; Parker Hannifin GmbH, Prädifa Packing Division, Bietigheim-Bissingen, Fed. Rep. of Germany; Power-Seal Corporation; Freudenberg-NOK, Milan, Ohio; W. S. Shamban Co., Santa Monica, Calif.; Busak & Luyken GmbH & Co., Stuttgart, Fed, Rep. of Germany; Martin Merkel GmbH & Co. KG, Hamburg, Fed. Rep. of Germany; and Greene Tweed, Kulpsville, Pa.

The demands placed on seals and sealing systems continue to increase. It therefore is believed that further improvements in the design of such seals and systems would be well-received by various industries.

BROAD STATEMENT OF THE INVENTION

The present invention is directed to an improved seal for the static or dynamic sealing of joints, machine parts or other components or structures such as may be found in choke, kill, or other auxiliary line strings for marine oil or gas well risers, hydraulic or pneumatic cylinders or other actuators, and more particularly to a U-cup or solid geometry profile having a secondary sealing lip on both the inner and outer diameter thereof which function as a wiper for the exclusion of outside contaminants, such as seawater, from joint sealed. In this regard, demands occasioned by higher operating pressures, harsh service environments, closer tolerances and clearances, design geometries, the need to retrofit existing equipment, and other factors often complicate the incorporation of separate sealing and wiping elements. The present invention therefore comprehends a seal profile having, in addition to primary sealing lips on the inner and outer diameters thereof, secondary sealing lips on each of those diameter.

In this regard, in marine and other service environments, back pressure developed by the undersea or other ambient pressure can result in the ingress of seawater. Sand, dirt, and other contaminants in the seawater can lodge between the seal and the joint surfaces and, over time and as the joint maybe subject to vibrational, torsional, flexure, and other loads, can score the seal and the surfaces resulting in leakage and the need to replace the seal and rework the surfaces. However, in accordance with the precepts of the seal profile of the present invention, the secondary sealing lips thereof are provided to be "squeezable," i.e., energizably compressed or otherwise stressed radially between the surfaces being sealed to develop secondary sealing lines about the inner and outer diameters of the seal for the exclusion of outside contaminants from the joint, and particularly from between the seal and the joint surfaces.

Unlike earlier profiles having secondary sealing lip on the inside diameter thereof which primarily stabilizes the seal within the gland, the seal profile of the present invention is able to effect a true sealing line around both the inner and other diameters for the exclusion of contaminates from both sides of the seal, and without the need for a separate wiper element. Moreover, by virtue of its integration of sealing and wiping functions, the seal of the present invention advantageously may be used to retrofit existing joint designs.

The present invention, accordingly, comprises the construction, combination of elements, and/or arrangement of parts and steps which are exemplified in the detailed disclosure to follow. Advantages of the present invention include a seal profile having integrated sealing and wiping function. Additional advantages include a seal design, particularly adapted for static joint applications in harsh service environments such as between sections of riser auxiliary lines but which also may find utility in dynamic applications such as a rod or piston seal, which is both reliable and economical. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
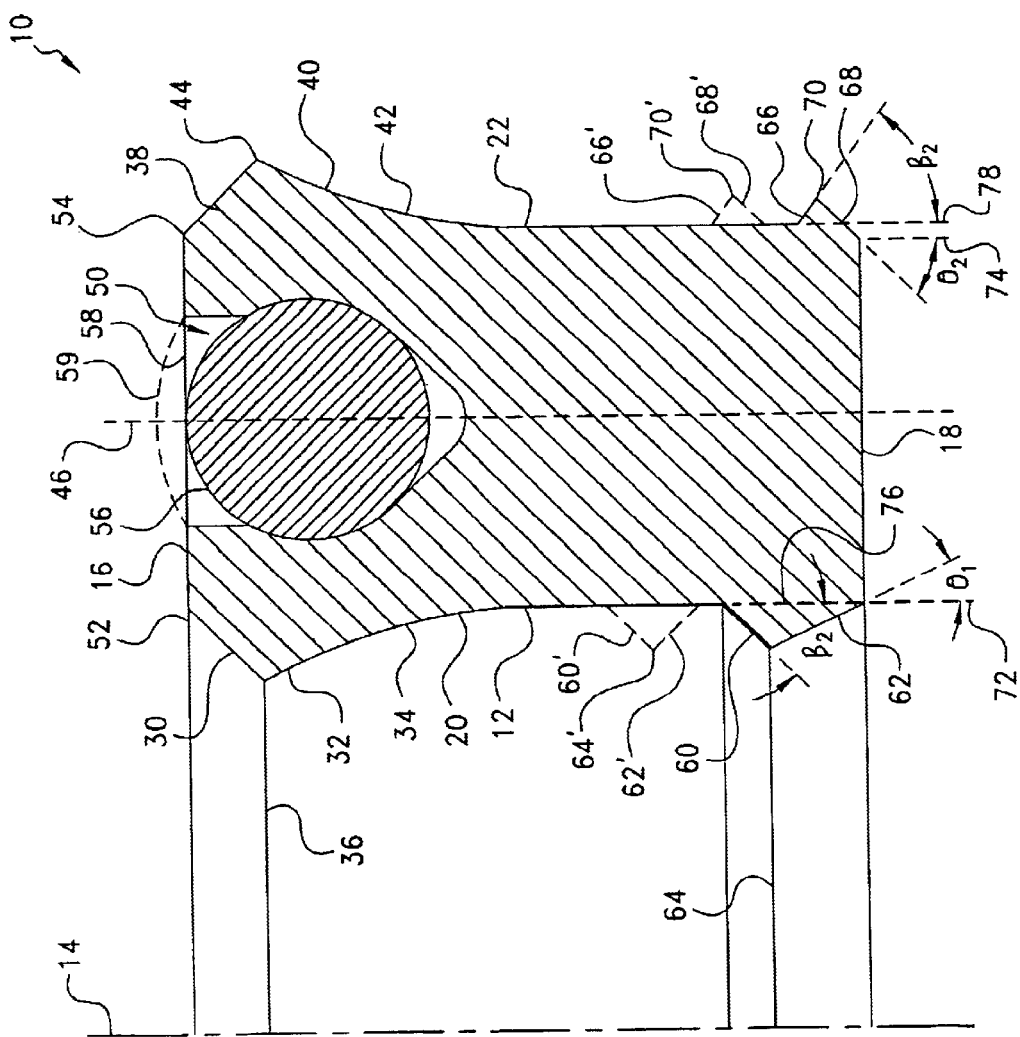
FIG. 1 is a partial view in longitudinal cross-section of a representative seal profile according to the present invention, such profile being depicted in its free state.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," "top" and "bottom," and "right" and "left" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For illustrative purposes, the precepts of the seal profile of the invention herein involved are described in connection with its use within a static joint assembly for coupling a male end of one section of a choke, kill, or other auxiliary line for a marine riser to the female end of an adjoining section. In view of the discourse to follow, however, it will be appreciated that aspects of the present invention may find utility in other assemblies involving other static surfaces, or involving reciprocating or other dynamic surface such the piston or rod of a pneumatic or hydraulic cylinder or other actuator. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, a representative seal ring according to the present invention is shown generally at 10 in FIG. 1. In the unstressed or free state of the seal ring 10 which is depicted in FIG. 1, the seal ring 10 has a generally annular body, 12, which may be seen in profile to include, relative to the longitudinal axis referenced at 14 through the center of the ring 10, first and second end faces, 16 and 18, which are spaced-apart axially along axis 14, and which extend intermediate an inner and an outer diameter face, 20 and 22, which, in turn, are spaced-apart radially relative to the axis 14.

As may be seen, the inner diameter face 20 is formed, such as by the intersection of the surface 30 extending from the first end face 16 and the oppositely-angled surface 32 extending from a main inner surface, 34, of the inner diameter face 20, to define a circumferential inner primary sealing line or lip, 36. The outer diameter face 22, in turn, is similarly and, in the embodiment shown, generally symmetrically formed, such as by the intersection the surface 38 extending from the first end face 16 and the oppositely-angled surface 40 extending from a main outer surface, 42, to define a circumferential outer primary sealing lip, 44. Relative to the central longitudinal axis referenced at 46 taken through the cross-section of the body 12, each of the primary sealing lips 36 and 44 extends radially outwardly therefrom for sealing contact engagement with a corresponding one of the surfaces of the joint to be sealed.

Further in the embodiment of the seal ring 10 illustrated in FIG. 1, the first end face 16 is axially birfurcated, such as by the generally parabolic-shaped, radial circumferentially-extending recess referenced at 50, into the general shape of a U-cup in defining an inner sealing arm portion, 52, on which the inner primary sealing lip 36 is carried, and an outer sealing arm portion, 54, on which the outer primary sealing lip 44 is carried. Although not required, the described bifurcation allows for the pre-loading or other energization of the lips 36 and 34 with a spring or, as shown, an O-ring or other shape ring expander, 56, which may be inserted or mounted, molded-in-place, or otherwise received within the recess 50. Such pre-loading in general develops a positive loading on the sealing lips 36 and 44 which is independent of the fluid system pressure, and which therefore may provide for more effective sealing at low system pressure or vacuum. Alternatively, the ring 10 may be formed as a U-cup generally as shown but without the expander 56, or as having a more solid geometry with the first end face 16 being essentially planar, such as is depicted in phantom at 58, or as having some degree of convexity to form a dome or bead-like profile, such as is depicted in phantom at 59.

The body 12 of seal ring 10 may be conventionally molded, extruded and cut, or otherwise formed of an elastomeric material which specifically may be selected for high temperature performance, flexibility, or otherwise for compatibility with the fluid being handled. Suitable materials, which may be filled, for example, with glass or carbon, or which may be unfilled, include natural rubbers such as Hevea and thermoplastic, i.e., melt-processible, or thermosetting, i.e., vulcanizable, synthetic rubbers such as fluoropolymer, chlorosulfonate, polybutadiene, butyl, neoprene, nitrile, polyisoprene, buna-N, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyolefins, polyesters, ethylene vinyl acetates, fluoropolymers, and polyvinyl chloride. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

The ring expander 56 may be formed of the same or different material as the seal ring body 12. As before, such material be selected for compatibility with the fluid being handled, and also for compatibility with the material of the body 12, and further as having a modulus, durometer, or the like selected to achieve the desired pre-loading effect.

With continuing reference to FIG. 1, the inner diameter face 20 further is formed, such as by the intersection of the angled surface 60 extending radially outwardly from the main inner surface 34 and the oppositely-angled heel surface 62 extending from the second end face 18, to define a circumferential inner secondary sealing lip, 64. In accordance with the precepts of the present invention, the outer diameter face similarly is further formed, such as by the intersection of the angled surface 66 extending from the main outer surface 42 and the oppositely-angled heel surface 68 extending from the second end face 18, to define a circumferential outer secondary sealing lip, 70. Although the measure of the angles is not believed to be critical to the invention herein involved, each of the heel surfaces 62 and 68 may define an included angle, referenced respectively at for $\theta_1$ and $\theta_2$, of, independently, between about 10–70° with the vertical reference lines depicted at 72 and 74, with the surfaces 60 and 66, in turn defining an included angle, referenced respectively at $\beta_1$ and $\beta_2$, of, independently, between about 10–70° with the vertical reference lines depicted at 76 and 78.

It should be understood that by maximizing the axial spacing between the primary and secondary inner sealing lips 36 and 64, and between the primary and secondary outer sealing lips 44 and 70, the stability of the sealing rings 10 within its mounting gland or groove will be increased. In this regard, however, although the secondary sealing lips are shown in FIG. 1 to be formed by the heel surfaces 62 and 68, it should be considered within the scope of the invention herein involved to have those surfaces, as is shown in phantom at 62' and 68', alternatively extend from the corresponding one of the main surfaces 34 and 42, such that the lips 64' and 70' so formed are moved closed to the lips 36 and 44. Indeed, one or both of the lips 64' and 70', or multiple lips 64' and 70', may be provided in addition to the lips 64 and 70 so as provide additional sealing contacts. Also, although the lips 64 and 70 each are shown to be axially displaced somewhat from the other, i.e., lip 64 is higher than lip 70, by varying, or example, the corresponding angles $\theta$ and $\beta$, and/or the relative axial lengths of the surfaces 60 and 62, and 66 and 68, or by forming one or both of the lips 64 and 70 in the manner shown at 64' and 70', the lip arrangement may be changed such that lip 70 may be disposed higher than lip 64 or such that the lips 64 and 70 each may be disposed generally in registration with the other.

Figure 2:
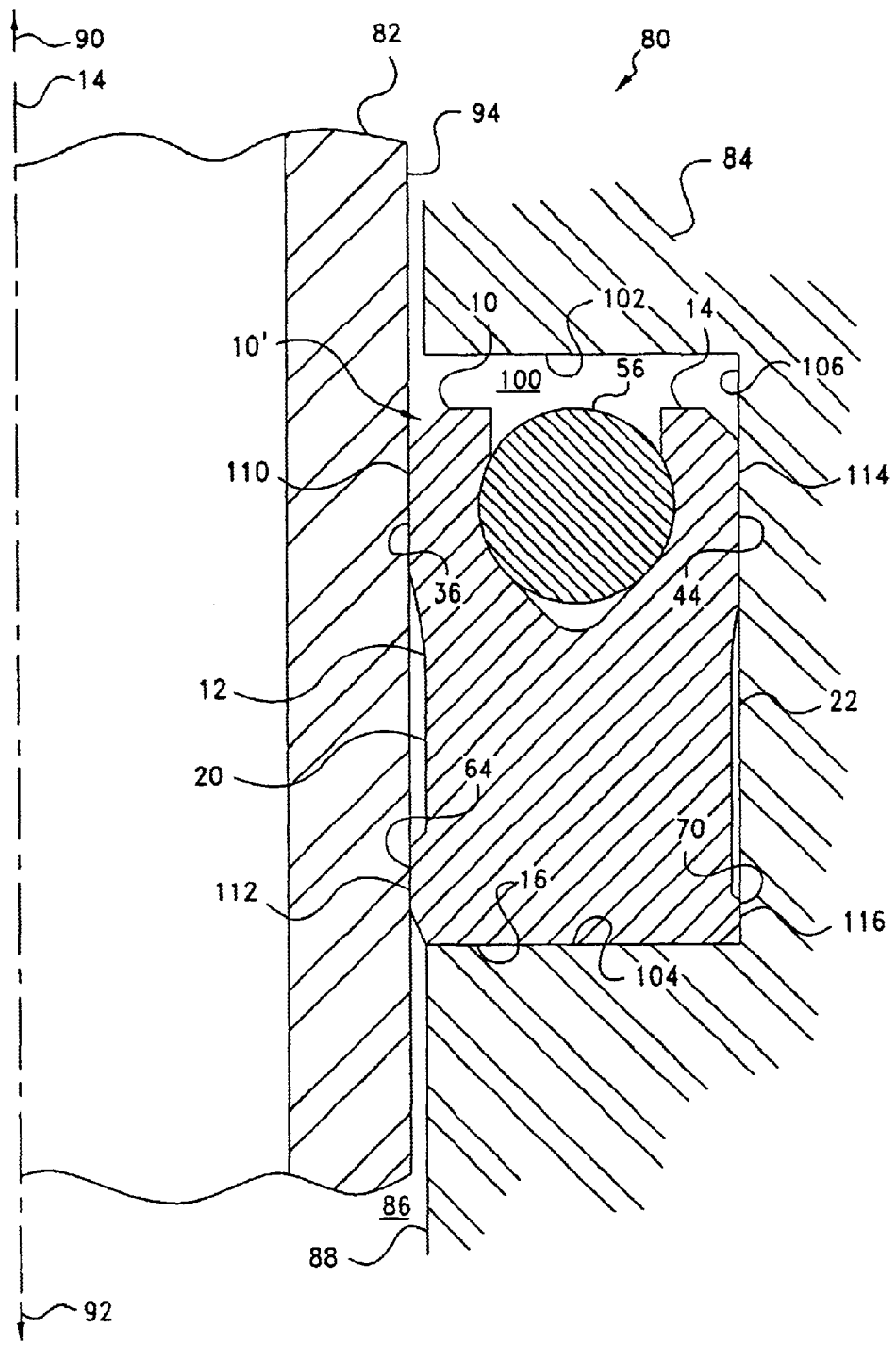
FIG. 2 is a partial view in longitudinal cross-section of representative joint assembly including the seal profile of FIG. 1, such profile being depicted in an energized state.

Referring now to FIG. 2, seal ring 10 of the present invention reappears as installed within a representative joint assembly, shown generally at 80, which may be, for example, a static joint assembly for coupling a male end, 82, of one section of a choke, kill, or other auxiliary line for a marine riser to a female end, 84, of an adjoining section. The female end 84 includes a bore or other opening 86, having a generally annular inner surface, 88. The bore inner surface 88 extends along a central longitudinal axis, commonly referenced with the seal ring axis at 14, in a first direction, represented by arrow 90, which for convention may be considered in the direction of an upstream or high pressure side of the fluid pressure system, and in a second direction, represented by arrow 92, which for purposes of convention may be considered in the direction of a downstream low or ambient fluid pressure side of the system. The male end 82 has an outer an outer, generally cylindrical surface, 94, which extends along axis 14. With the male end 82 received within the female end 84 and being coupled thereto, such as via a threaded, welded, or interference fitting engagement, the male end outer surface 94 is disposed in concentric opposition to the female end inner surface 88.

For mountably receiving one or more seal ring 10, the annular inner surface 88 of the female end 84 is provided as having one or more glands, one of which is referenced at 100, machined, cast or molded, or otherwise defined therein intermediate the high and low pressure fluid sides of the assembly 80. Gland 100 is conventionally configured as having a first end wall, 102, a second end wall, 104, axially-spaced apart from the first end wall 102, and a peripheral wall, 106, which extends axially between the walls 102 and 104, and radially circumferentially about the axis 14. Depending upon the requirements of the intended application, it will be understood that gland 100 alternatively may be formed in the male end outer surface 94.

Seal ring 10 is mounted coaxially within gland 100 and effects a fluid seal between the interfacing surfaces 88 and 94. In the arrangement shown in FIG. 2, seal ring 10 is mounted, for example, with the first end face 14 thereof being disposed opposite the gland first end wall 102, and the seal ring second end face 16 being disposed opposite the gland second end wall 104. Of course, the orientation of the ring 10 within the gland 100 maybe reversed, and, optionally, a backup ring (not shown) may be received in gland 100 coaxially with the seal ring 10. Backup rings in general typically are used to delimit the extrusion of seals into the clearance gap between the interfacing surfaces being sealed. As compared to the seal itself, the backup ring typically is formed of a relatively harder, tougher, and more rigid material, such as a filled or unfilled nylon, an acetal polymer such as Delrin® (Du Pont, Wilmington, Del.), polybutylene terephthalate (PBT), polyetherketone (PEK) or the like. Within the gland 100, the seal ring inner diameter face 20 is disposed concentrically opposing the male end outer surface 94, with the seal ring outer diameter face 22 is disposed concentrically opposing the gland peripheral wall 106.

Being mounted with the gland 100 as so described, the seal ring 10 is compressed radially intermediate the male end outer surface 94 and the gland peripheral wall 106 into the stressed or energized state which is referenced at 10' in FIG. 2. In such state, the seal ring inner diameter face 20 is made to sealingly engage the male end outer surface 94 along the generally annular sealing loci, referenced at 110 and 112, formed by the contact, respectively, of the inner primary and secondary sealing lips 36 and 64, with the seal ring outer diameter face 22 being made to sealingly engage the female end outer surface 88 along the generally annular sealing loci, referenced at 114 and 116, formed by the contact, respectively, of the outer primary and secondary sealing lips 44 and 70. Advantageously, the provision of the outer secondary sealing lip 70 in conjunction with the inner secondary sealing lip 64 effects a "squeezing," i.e., radial compression and load or stress energization, thereof and the consequent development of a true secondary seal against, for example, the ingress of contaminants carried in seawater or external fluid which otherwise might seep into the gland such as between the seal ring outer diameter face 20 and the gland peripheral wall 106. Such squeezing, moreover, further improves the stability of the seal ring within the gland against the effects of torsion, rocking, and the like. Particularly in static joint applications such as for choke, kill, or other marine riser auxiliary line connections, it has been observed that the seal ring 10 of the present invention affords unexpectedly improved sealing performance and service life over a comparable sealing ring lacking an outer secondary sealing lip. In the configuration shown in FIGS. 1 and 2, sing ring 10 also may provide bidirectionally sealing in dynamic applications.

It is anticipated that certain changes may be made in the present invention without departing from the precepts herein involved. Accordingly, the foregoing description should be interpreted as illustrative and not in a limiting sense. All references including any priority documents cited herein are expressly incorporated by reference.

What is claimed is:

1. A seal ring for installation within an assembly including a first part having a generally annular surface which extends along a central longitudinal assembly axis, and a second part having a generally cylindrical surface disposed in concentric opposition to the annular surface of the first part, a first one of the surfaces of the first and second parts having a gland defined therein, the gland having a first end wall and a second end wall spaced-apart axially from the first end wall, and a peripheral wall extending axially between the first and second end walls and radially circumferentially about the assembly axis, the seal ring comprising a generally annular body configured to be receivable within the gland coaxially with the assembly axis intermediate the first and second parts, the body having a radial first end face disposable opposite the gland first end wall, and a radial second end face spaced-apart axially from the first end face along a central longitudinal body axis taken through an axial cross-section of the body, and being disposable opposite the gland second end wall, and the body having an inner diameter face extending axially intermediate the first and second end face and disposable opposite first part surface, and an outer diameter face spaced-apart radially from the inner diameter face and extending intermediate the first and second end face, and being disposable opposite the gland second part surface, the inner diameter face having a circumferential first inner sealing lip extending radially outwardly relative the body axis, and a circumferential second inner sealing lip spaced-apart axially from the first inner sealing lip end portion and extending radially outwardly relative to the body axis, and the outer diameter face having a circumferential first outer sealing lip extending radially outwardly relative to the body axis, and a circumferential second outer sealing lip spaced-apart axially from the first inner sealing lip and extending radially outwardly relative to the body axis, wherein the first inner and outer sealing lips are compressible radially intermediate the first and second part surfaces to contact the surfaces along, respectively, a first inner and a first outer sealing locus, and the second inner and outer sealing lips are compressible radially intermediate the first and second part surfaces to contact the surfaces along, respectively, a second inner and a second outer sealing locus.

2. The seal ring of claim 1 wherein the body is formed of an elastomeric polymeric material.

3. The seal ring of claim 2 wherein the elastomeric polymeric material is selected from the group consisting of filled or unfilled natural rubbers, synthetic rubbers, and fluoropolymers.

4. The seal ring of claim 1 wherein the first upper end face is bifurcated axially by a circumferentially extending recess in defining a first sealing arm portion and a second sealing arm portion, the first sealing lip being located on the first sealing arm portion, and the second sealing lip being located on the second sealing arm portion.

5. The seal ring of claim 4 further comprising a generally annular expander received within the recess.

6. The seal ring of claim 1 wherein:
   the inner diameter face has a first inner angled surface which extends from intermediate the first inner sealing lip and the second end face, and a second inner angled surface which extends from intermediate the first inner angled surface and the second end face, the first and second inner angled surfaces being intersecting to define the second inner sealing lip; and
   the outer diameter face has a first outer angled surface which extends from intermediate the first outer sealing lip and the second end face, and a second outer angled surface which extends from intermediate the first outer angled surface and the second end face, the first and second outer angled surfaces being intersecting to define the second outer sealing lip.

7. The seal ring of claim 6 wherein the second inner and outer angled surfaces each defines, independently, an angle of between about 10–70° with vertical.

8. The seal ring of claim 6 wherein the second inner and outer angled surfaces each adjoins the second end face.

9. An assembly comprising:
   first part having a generally annular surface which extends along a central longitudinal assembly axis;
   a second part having a generally cylindrical surface disposed in concentric opposition to the annular surface of the first part, a first one of the surfaces of the first and second parts having a gland defined therein, the gland having a first end wall and a second end wall spaced-apart axially from the first end wall, and a peripheral wall extending axially between the first and second end walls and radially circumferentially about the assembly axis; and
   a seal ring received within the gland coaxially with the assembly axis intermediate the first and second parts, the body having a radial first end face disposed opposite the gland first end wall, and a radial second end face spaced-apart axially from the first end face along a central longitudinal body axis taken through an axial cross-section of the body, and being disposed opposite the gland second end wall, and the body having an inner diameter face extending axially intermediate the first and second end face and disposed opposite first part surface, and an outer diameter face spaced-apart radially from the inner diameter face and extending intermediate the first and second end face, and being disposed opposite the gland second part surface, the inner diameter face having a circumferential first inner sealing lip extending radially outwardly relative to the body axis, and a circumferential second inner sealing lip spaced-apart axially from the first inner sealing lip end portion and extending radially outwardly relative to the body axis, and the outer diameter face having a circumferential first outer sealing lip extending radially outwardly relative the body axis, and a circumferential second outer sealing lip spaced-apart axially from the first inner sealing lip and extending radially outwardly relative to the body axis,
   wherein the first inner and outer sealing lips are compressed radially intermediate the first and second part surfaces to contact the surfaces along, respectively, a first inner and a first outer sealing locus, and the second inner and outer sealing lips are compressed radially intermediate the first and second part surfaces to contact the surfaces along, respectively, a second inner and a second outer sealing locus.

10. The assembly of claim 9 wherein the seal ring body is formed of an elastomeric polymeric material.

11. The assembly of claim 10 wherein the elastomeric polymeric material is selected from the group consisting of filled or unfilled natural rubbers, synthetic rubbers, and fluoropolymers.

12. The assembly of claim 9 wherein the first upper end face of the seal ring body is bifurcated axially by a circumferentially extending recess in defining a first sealing arm portion and a second sealing arm portion, the first sealing lip being located on the first sealing arm portion, and the second sealing lip being located on the second sealing arm portion.

13. The assembly of claim 12 further comprising a generally annular expander received within the recess of the seal ring body.

14. The assembly of claim 9 wherein:
   the inner diameter face of the seal ring body has a first inner angled surface which extends from intermediate the first inner sealing lip and the second end face, and a second inner angled surface which extends from intermediate the first inner angled surface and the second end face, the first and second inner angled surfaces being intersecting to define the second inner sealing lip; and
   the outer diameter face of the seal ring body has a first outer angled surface which extends from intermediate the first outer sealing lip and the second end face, and a second outer angled surface which extends from intermediate the first outer angled surface and the second end face, the first and second outer angled surfaces being intersecting to define the second outer sealing lip.

15. The assembly of claim 14 wherein the second inner and outer angled surfaces each defines, independently, an angle of between about 10–70° with vertical.

16. The assembly of claim 14 wherein the second inner and outer angled surfaces each adjoins the second end face.

* * * * *